Sept. 8, 1925.

M. F. PLACE

HANDLE

Filed May 21, 1924

1,553,297

INVENTOR.
Morrill F. Place
BY Samuel Siegel
ATTORNEY.

Patented Sept. 8, 1925.

1,553,297

UNITED STATES PATENT OFFICE.

MORRILL F. PLACE, OF CHARLESTOWN, MASSACHUSETTS.

HANDLE.

Application filed May 21, 1924. Serial No. 714,938.

*To all whom it may concern:*

Be it known that I, MORRILL F. PLACE, a citizen of the United States, residing at 34 Pearl Street, Charlestown, in the county of Suffolk and State of Massachusetts, have invented certain new and useful Improvements in Handles, of which the following is a specification.

This invention relates to detachable handles for grips, traveling bags and the like.

The object of the invention resides in the provision of an improved handle for grips and the like which can be readily attached to and detached from the same and which will be simple in construction, durable and relatively cheap to manufacture.

In one of its aspects the present invention is an improvement on the invention forming the subject matter of an application for United States Letter Patent filed March 30, 1923, Serial Number 628,777, by the same inventor, in that in addition to the provision of a detachable handle as described in the above cited application, also provides positive means for keeping the U shaped arm in its downward folded position when not actually used in carrying the suit case or other bundle to which it is applied.

With the above and other objects in view the invention consists in the details of construction and in the arrangement and combination of parts to be hereinafter more fully described and particularly pointed out in the appended claims.

In describing the invention in detail, references will be had to the accompanying drawings.

Figure 1:
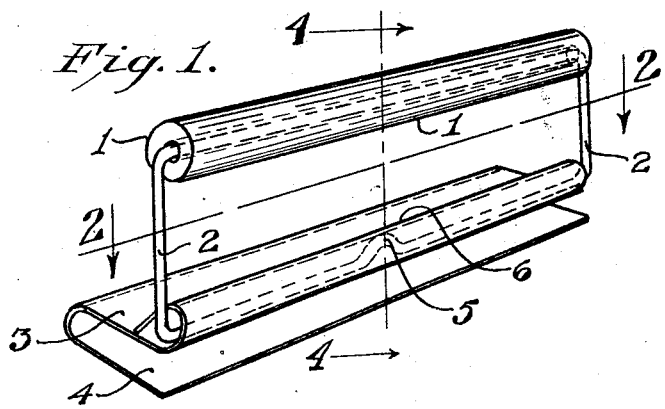
Figure 1 is a perspective view showing the improved handle and the means shown in dotted lines to keep it in the folded position.
Figure 2:
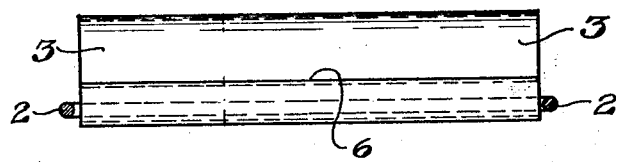
Figure 2 is a sectional view on line 2—2 of Figure 1.

Referring to the drawing, the improved handle is shown comprising a piece of wire 2 or other suitable material, bent to form a rectangle. In one of the sides of this rectangle there is formed a ridge or crest 5. A sleeve of some material is slipped over the opposite side of this rectangle, and is of such shape as to comfortably fit in the hand.

Figure 3:
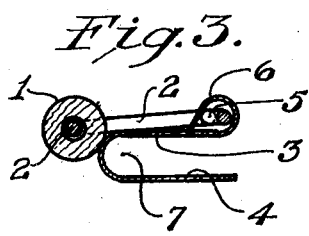
Figure 3 is a vertical section of the article as shown in Figure 1, with the handle in the folded position.
Figure 4:
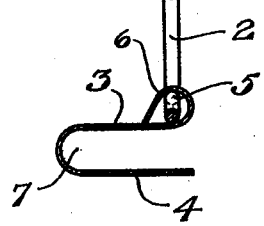
Figure 4 is a section on line 4—4 of Figure 1.

A piece of flat metal is bent so as to assume a U-shaped form. An eye 6 is formed at one end of this flat piece of metal. The side of the rectangle with the ridge in it is rotatably connected to the U-shaped plate, and the ridge fits snugly in the eye 6. The crest 3 is so formed in its relation to the eye 6, that when the handle is in its downward position as shown in Figure 3, it is held securely in that position and will not dangle about.

Having described my invention what I claim is:—

1. A removable carrier consisting of a rectangular shaped arm pivotally connected to a U-shaped plate, and positive means to keep the handle in a folded position.

2. A removable carrier consisting of a piece of metal bent to form a rectangle, a sleeve mounted on one side of the rectangle, a crest formed in the opposite side, and rotatably connected to a U-shaped holder having an eye in one end.

3. A removable carrier consisting of a piece of metal bent to form a rectangle, a sleeve mounted on one side of the rectangle, a crest formed in the opposite side, and rotatably connected to a U-shaped holder having an eye in one end, said crest and eye forming positive means to keep the handle in a folded position.

MORRILL F. PLACE.